July 21, 1936.  W. H. RICHARDS  2,047,983
CAMERA SHUTTER
Filed Aug. 31, 1934   2 Sheets-Sheet 1

INVENTOR
WILLIAM H. RICHARDS
ATTORNEYS

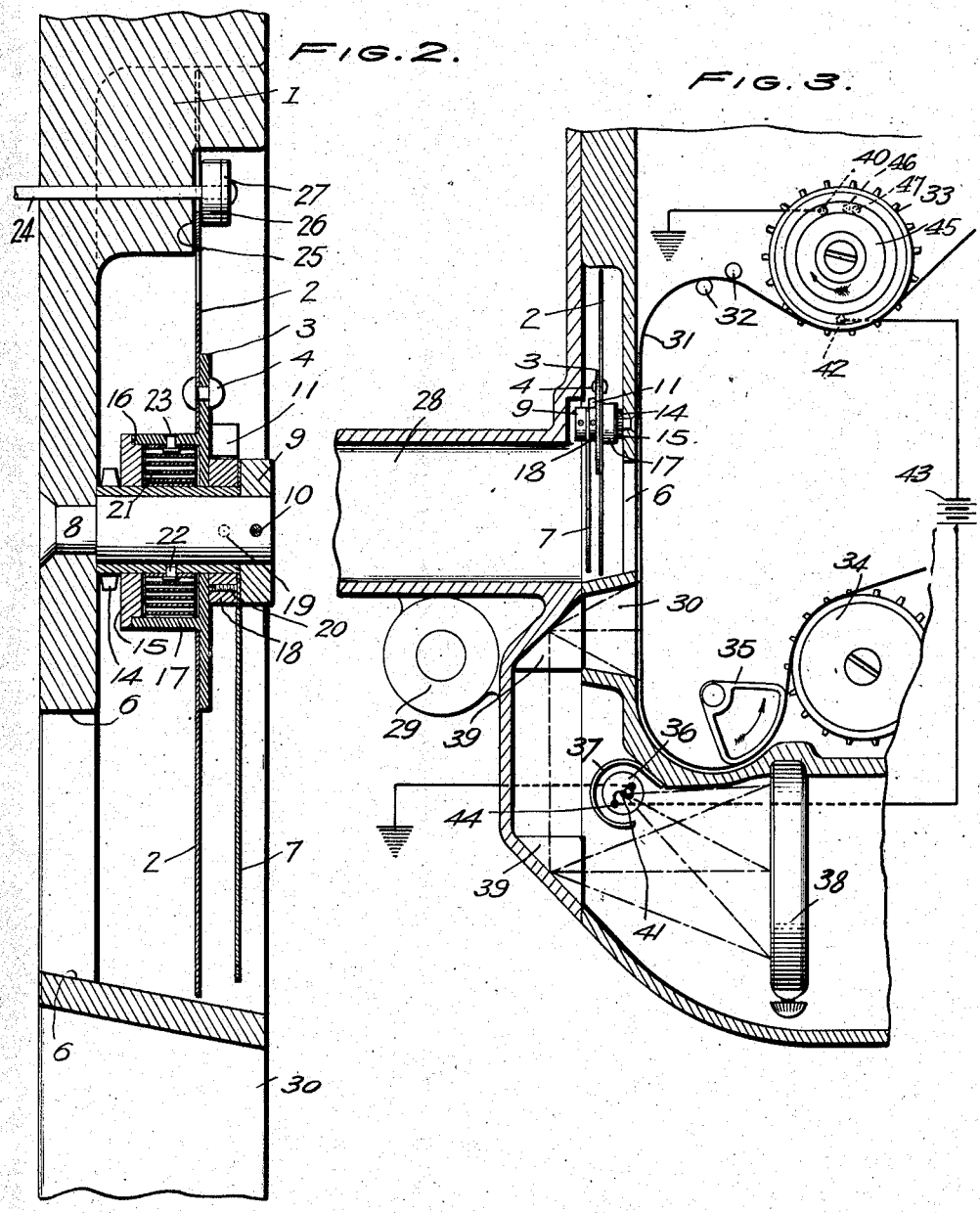

Patented July 21, 1936

2,047,983

UNITED STATES PATENT OFFICE 2,047,983

CAMERA SHUTTER

William H. Richards, Dayton, Ohio

Application August 31, 1934, Serial No. 742,269

5 Claims. (Cl. 88—19.3)

(Granted under the act of March 3, 1883, as amended April 30, 1928; 370 O. G. 757)

The invention described herein may be manufactured and used by or for the Government for governmental purposes, without the payment to me of any royalty thereon.

The invention pertains to the blocking off of motion picture camera film, at any desired point, in order that a predetermined title or image other than that taken through the main lens may be exposed upon the blocked-off portion of film without interruption of normal camera operation.

The invention finds particular adaptation to gun cameras. Since each aircraft engaged in simulated aerial combat is individually equipped with such a camera, it is of vital importance that the exact time of the "firing" of each camera "burst" be permanently recorded. It is only through inclusion of the time element that film records of an aerial combat can be properly scored.

It has been the custom, in the past, to have the individual exposures of each camera "burst" include the face of a time recording instrument. Since the major portion of each gun camera exposure is covered by sighting indicia, the space available for an image such as the face of a watch is very limited, necessitating film magnification or print enlargement before scoring of combat records can be undertaken.

It is an object of the invention to provide an unexposed portion of film at the end of each gun camera "burst" upon which may be exposed the image of a watch face of sufficient size to be readily read in hours, minutes, and seconds, directly from the film proper.

It is a further object of the invention to provide at the termination of any continuous motion picture exposure an unexposed portion of film upon which may be projected the image of a date memorandum, title block, or equivalent.

It is a still further purpose of the invention to accomplish the object set forth in the above paragraph for title blocks employing characters of a size permitting them to be read directly from the film proper.

With the foregoing and other objects in view, which will appear as the description proceeds, the invention consists of certain new and novel improvements in camera shutters, which will hereinafter be more fully illustrated and described in the accompanying drawings and more particularly pointed out in the appended claims.

Referring to the drawings, in which numerals of like character designate similar parts throughout the several claims;

Fig. 2 is a cross-sectional view of Fig. 1 taken on the lines 2—2; and

Fig. 3 shows my shutter installation in a gun camera.

Figure 1:
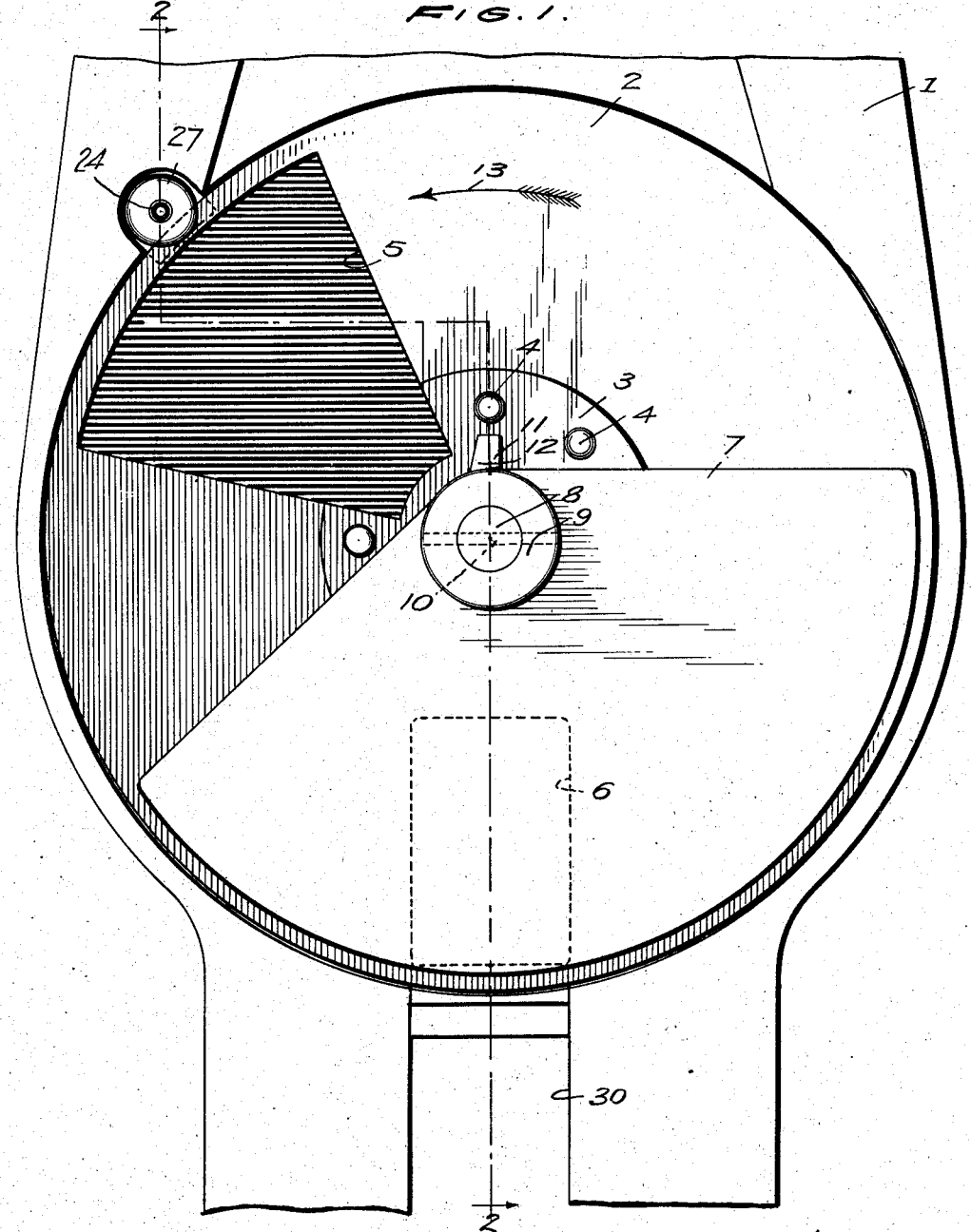
Fig. 1 is a plan view of a gun camera shutter incorporating my invention.

In Fig. 1, the lens-barrel housing of a gun camera has been removed to expose a portion of the forward face of a shutter housing 1. A main shutter 2 is secured to a flange 3 by means of rivets 4. The shutter 2 is provided with an opening 5 adapted to periodically register with a film aperture 6 in the shutter housing 1. An auxiliary shutter 7 is coaxially mounted about a bearing stud 8 and is prevented from forward movement by a collar 9 fixed to the bearing stud 8 by means of a pin 10. A positioning lug 11 extends outwardly from the forward face of flange 3 and is adapted to be normally held in operable engagement with a second positioning lug 12 fixedly secured to the auxiliary shutter 7. An arrow 13 indicates counter-clockwise rotation of both shutters, which occurs at the customary rate of sixteen revolutions per second. A braking mechanism, better shown in Fig. 2, is indicated at the upper left-hand portion of the housing 1.

Fig. 2 shows in detail the manner in which the shutters 2 and 7 are mounted, are normally driven in unison and under one condition are caused to move relatively to one another. The bearing stud 8 is riveted to the back face of the housing 1. A gear and tube driving unit 14 is journalled directly to the bearing stud 8. A ring 15 is journalled to the gear end of the driving unit 14. The ring 15 is provided with a shoulder 16, upon which is pressed a collar 17 forming an integral portion of the aft face of the flange 3. It will be noted that the assembled flange, collar and ring form an ample support for the main shutter 2 and that these parts forming the main shutter assembly are secured against longitudinal movement with respect to the driving unit 14 by means of a collar 18, from which projects the positioning lug 12, and two oppositely disposed pins 19. The auxiliary shutter 7 is fixedly secured to the forward face of the collar 18 by means of screws 20. The combined shutter assemblies are in turn secured against longitudinal movement with respect to the bearing stud 8 by means of the collar 9 and the pin 10. Since the main shutter assembly is free to rotate upon the driving unit 14, within the engaging limits of the lugs 11 and 12, a spring couple has been introduced therebetween. The inner end of a flat spiral spring 21 is fixedly secured to the driving unit 14 by means of a rivet 22, while the outer end thereof is similarly secured to the collar 17 by means of a rivet 23. The spring 21 is of sufficient tension to overcome inertia lag of the shutter 2, with respect to the directly driven auxiliary shutter 7, upon initial starting impulse of the driving unit 14 such that the positioning lugs 11 and 12 are substantially disposed as shown in Fig. 1 during commencement and continuance of the "firing" of a camera "burst". However, with sudden "braking" of the gear mechanism employed to actuate the driving unit 14, for the purpose of terminating the aforementioned "burst", simultaneously, tension of predetermined intensity is imparted to a draw rod 24, of the braking mechanism, causing the shutter 2 to be pressed against a ledge 25 of the housing 1 by a friction disc 26, backed by a washer 27. The shutter 2 is thus momentarily held in a position somewhat retarded to that shown in Fig. 1, as the auxiliary shutter 7 continues its counter-clockwise rotation to a position completely covering the opening 5. With coverage of the opening 5, sufficient tension is induced in the spiral spring 21 to momentarily overcome the initial friction induced by the ledge 25 and disc 26 and the combined shutters execute that remaining portion of a final revolution which is necessary to cause a single "blocked off" portion of film to pass into registration with a second film aperture located directly beneath the film aperture 6.

Fig. 3 shows a partial cross-section, in reduced scale, of the shutter housing 1 attached to a barrel housing 28, provided with a mounting lug 29 for pivotally securing the assembled camera to an aircraft gun mount. As stated above, a second film aperture 30 is located immediately beneath the film aperture 6 in the shutter housing 1. A film 31 is delivered to guide pins 32 by a feed sprocket 33. The film 31 extends downward, past the apertures 6 and 30, then loops upwardly over a take-up sprocket 34 designed to turn at the same constant rate as the feed sprocket 33. With each rotation of a beater 35, a portion of the film 31 sufficient for one film exposure is jerked into registration with the film aperture 6. Each second rotation of the beater 35 repositions the above film portion in registration with the film aperture 30. Assuming the "blocked-off" or unexposed portion of film referred to in the above paragraph to be so repositioned, a single "flash" from a lamp 36 encased within a shield 37 will cause an image of a watch 38 to be momentarily projected through the lenses 39 upon the film 31. While it is obvious that the aforementioned "flash" may be accomplished through the addition of a manually operated switch and small storage battery, automatic lighting is accomplished through employment of the inertia-operated electrical switch set forth in my co-pending application Serial Number 740,279, filed August 17, 1935, in which a flywheel 45 is coaxial and freely rotatably mounted within the open end of the feed sprocket 33. The adjacent surfaces of the aforesaid parts are sufficiently spaced to permit the fixing of a driving pin 46 and an insulated contactor pin 40 to the inner flanged surface of the feed sprocket 33. The inner surface of the flywheel 45 is provided with a driven pin 47, held in yielding contact with the driving pin 46. During all accelerating or uniform rotation of the feed sprocket 33, the pins 46 and 47 remain in contact. However, with sudden stoppage of the feed sprocket 33, the flywheel 45 continues its clockwise rotation until the driven pin 47 impacts the contactor pin 40, at which time the upper terminal of the battery 43 is grounded to the shutter housing 1.

Diagrammatic connection of the inertia-operated electrical switch and the lamp 36 is shown in Fig. 3. The contactor pin 40 of the aforesaid switch and a terminal 41 of the lamp 36 are grounded to the shutter housing 1. A terminal 42 of the aforesaid switch is connected to a battery 43, which, in turn, is connected to a terminal 44 of the lamp 36. Thus, any sudden stoppage of normal clockwise rotation of the feed sprocket 33 will cause momentary "closed contact" of the inertia-operated electrical switch, resulting in immediate exposure of the face of the watch 38 upon that portion of the film 31, which is in registration with the film aperture 36.

I claim:

1. In a motion picture camera having a bearing stud fixed adjacent to a film aperture provided in the forward wall of the camera housing, a driving unit journaled to said bearing stud, an auxiliary shutter fixed to said driving unit and including a positioning lug, a main shutter journaled to said driving unit having a positioning lug adapted to engage said first mentioned lug such that said shutters are aligned with closed portions overlapping, tension means normally inducing positioning lug engagement, and means for retarding by less than one revolution said main shutter with respect to said auxiliary shutter such that the closed portion of said auxiliary shutter is secured in overlapping alignment with the open portion of said main shutter.

2. In a motion picture camera having a bearing stud fixed adjacent to a film aperture provided in the forward wall of the camera housing, a driving unit journaled to said bearing stud, a sector fixed to said driving unit and including a positioning lug, a disc journaled to said driving unit having a sector-like opening adapted to be covered by said sector and including a positioning lug for engaging said first mentioned lug such that said sector-like opening is normally unobstructed, tension means normally inducing positioning lug engagement, and means for retarding by less than one revolution said disc with respect to said sector such that said sector-like opening is continuously covered by said sector.

3. In a motion picture camera having a bearing stud fixed adjacent to a film aperture provided in the forward wall of the camera housing, a gear and tube driving unit journaled to said bearing stud, a sector detachably secured to the tubing portion of said driving unit and including a positioning lug, a disc journaled to the tubing portion of said driving unit having a sector-like opening adapted to be covered by said sector and including a positioning lug for engaging said first mentioned lug such that said sector-like opening is normally unobstructed, tension means normally inducing positioning lug engagement, and braking means secured to said camera housing for retarding by less than one revolution said disc with respect to said sector such that said sector-like opening is covered by said sector during continuing rotation of the disc-sector assembly.

4. In a motion picture camera having a power-rotated sector operatively associated with a film aperture therewithin, a disc journaled to said sector and provided with a sector-like opening adapted to be completely covered by said sector, said sector and disc each being provided with a positioning lug, a helical spring inducing positioning lug engagement such that said disc opening is normally unobstructed during the driving of said disc by said sector, and manually operated means for temporarily rotationally shifting initial alignment of said disc with respect to said sector during continuing rotation thereof such that said sector momentarily covers said disc opening for preventing image passage through said film aperture.

5. In a motion picture camera having a film aperture provided in the forward wall of the camera housing, a power-rotated sector operatively associated with said film aperture, a disc journaled to said sector and provided with a sector-like opening adapted to be completely covered by said sector, said sector and disc each being provided with a positioning lug, a helical spring inducing positioning lug engagement such that said disc opening is normally unobstructed during the driving of said disc by said sector, and manually operated braking means secured to said housing and applied at the periphery of said disc to limitedly retard rotation thereof with respect to said sector during continuing rotation thereof such that said sector momentarily covers said disc opening for preventing image passage through said film aperture.

WILLIAM H. RICHARDS.